United States Patent [19]

Petersen

[11] 4,291,866
[45] Sep. 29, 1981

[54] SUPPORT FOR WINDSHIELD REPAIR APPARATUS

[75] Inventor: Paul S. Petersen, Minnetonka, Minn.

[73] Assignee: Novus Inc., Minneapolis, Minn.

[21] Appl. No.: 93,197

[22] Filed: Nov. 13, 1979

[51] Int. Cl.³ .................. B25B 3/00; B25B 11/00
[52] U.S. Cl. .......................... 269/1; 269/75; 269/95; 269/909; 248/362; 248/363
[58] Field of Search .............. 248/362, 363; 294/64 R; 428/65; 264/36; 65/28; 156/94, 391; 269/21, 45, 37, 75, 254 R, 321 W, 95, 1

[56] References Cited
U.S. PATENT DOCUMENTS

| | | | |
|---|---|---|---|
| 1,828,791 | 10/1931 | Thompson | 269/95 |
| 2,653,001 | 9/1953 | Padjen | 248/363 |
| 2,669,958 | 2/1954 | Sweeney | 269/45 |
| 2,752,914 | 7/1956 | Pohlman | 248/362 |
| 3,988,400 | 10/1976 | Luhman | 264/36 |
| 3,993,520 | 11/1976 | Werner et al. | 159/94 |

Primary Examiner—Robert C. Watson
Attorney, Agent, or Firm—Kinney, Lange, Braddock, Westman and Fairbairn

[57] ABSTRACT

A support member or bridge member used for holding a repair material injector in proper position relative to a piece of glass that is to be repaired, such as a windshield, and which holds the injector under a predetermined spring load even when there is a rounded or curved surface to be repaired. The support is self orienting relative to the windshield so that the injector used for injecting repair materials is held normal to the tangent plane at the opening of a break that is to be repaired in the windshield.

19 Claims, 4 Drawing Figures

SUPPORT FOR WINDSHIELD REPAIR APPARATUS

BACKGROUND OF THE INVENTION

1. Field of the Invention

The present invention relates to supports or bridges for holding windshield repair apparatus in proper position.

2. Prior Art

The present support or bridge is specifically adapted for use with an injector assembly for repairing breaks in windshields as shown in U.S. Pat. No. 3,993,520, issued Nov. 23, 1976. The present device replaces the bridge assembly shown therein with a single suction cup holding member that provides good stability and automatically accommodates for curvatures of the surface of the windshield. The plunger assembly for injecting sealing material that is shown in said patent can be used by threading it into the provided holder shown herein.

In most instances, the type of device shown in U.S. Pat. No. 3,993,520 is used for repairing bull's-eye type breaks in windshields while they are still in place on the cars.

An additional type of support member used in repairing windshields is shown in U.S. Pat. No. 3,988,400, which does also include suction cup members, but this support assembly does not adjust and accommodate curvature as the present device does.

SUMMARY OF THE INVENTION

The present invention relates to a support for windshield repair material injectors which attaches easily to the windshield, and which includes self leveling and loading features that provide for a spring load of the injector apparatus against the windshield. The support includes a ball type or spherical type mounting for the holder which supports a liquid injector. The support assembly as shown also is capable of being pivoted about an axis generally perpendicular to the windshield to provide for adjustment to obtain proper alignment of the injector and break opening after the support is secured to the windshield through use of a suction cup.

The amount of force with which the injector support is urged against the windshield can be varied by a thumb screw adjustment. It also will be noted that in the preferred form the support for the injector assembly used for injecting repair materials into the breaks to be repaired is formed as a tripod for self alignment and stability purposes as well.

DESCRIPTION OF THE PREFERRED EMBODIMENT

Figure 2:
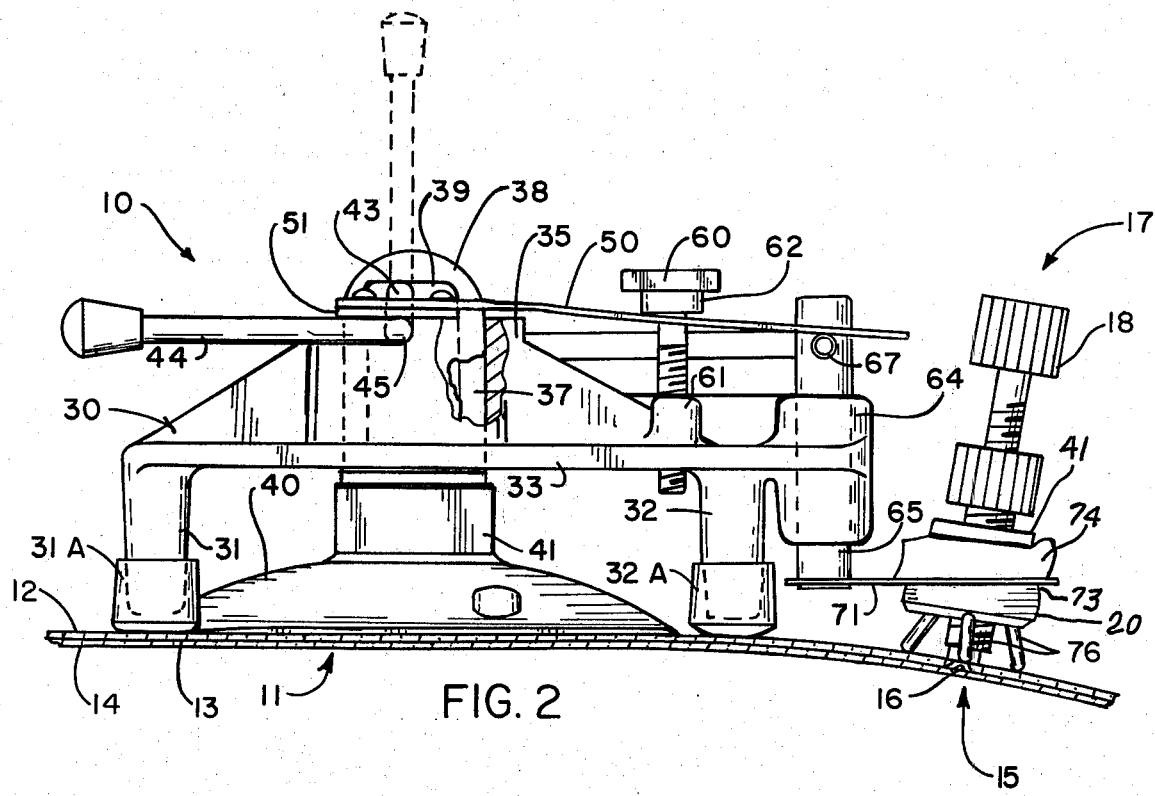
FIG. 2 is a side elevational view of the device of FIG. 1.
Figure 3:
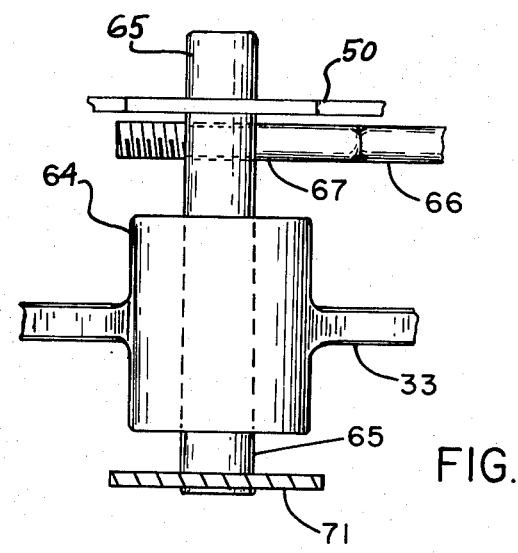
FIG. 3 is a sectional view taken as on line 3—3 in FIG. 1.

Referring specifically first to FIG. 2, the support apparatus illustrated generally at 10 is mounted onto a windshield 11 that is of the usual safety glass or sandwich construction of two layers or sheets of glass 12 and 14 with a plastic layer 13 between the glass sheets. A "bull's-eye" break illustrated generally at 15 is represented by an inverted cone shaped piece of glass 16 that is broken out of the outer sheet of glass. In repair, a liquid resin is forced into the cracked area to fill and seal the break completely. Chips can be removed before injecting the resin and generally the repair can take the steps of the process described in U.S. Pat. No. 3,993,520.

The support 10 is thus used for supporting an injector assembly illustrated generally at 17. The injector assembly includes an outer housing 18, that is threaded into a self aligning support member 20, the mounting of which will be more fully explained. The housing has an interior rubber sleeve 21, the outer end of which seals against the surface of the windshield 11 after the end has been forced against the surface. An interior screw assembly 22 includes an injector end 23 that slidably mounts inside the tube 21, and the upper end of the screw assembly 22 is threadably mounted on interior threads in housing 18. By threading the screw 22 downwardly, resin inside the sleeve 21 can be forced into the break 15 that is aligned with the open end of the tube 21, to inject this resin into the crack to form the repair.

The plunger assembly thus identical in operation to that shown in U.S. Pat. No. 3,988,400, but of course other plunger assemblies can also be mounted on support member 20. The present invention is not limited to any particular injector assembly, in that other types of devices can be attached and held in position on member 20 of the present support assembly 10.

Figure 1:
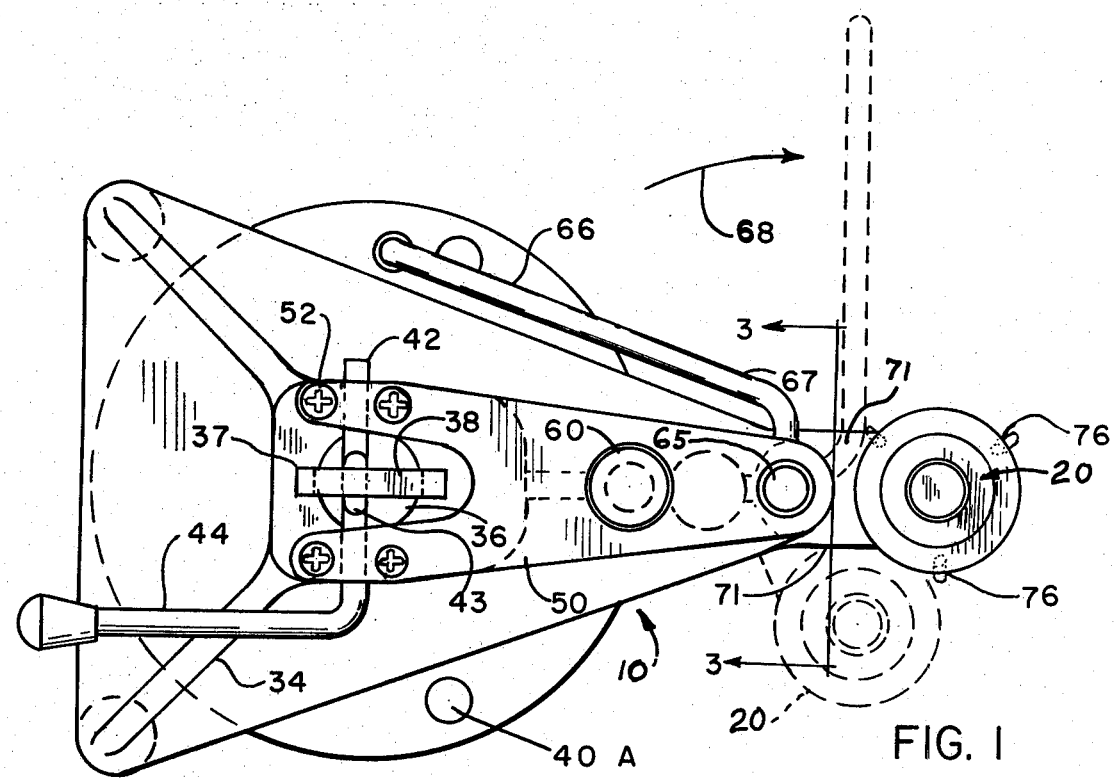
FIG. 1 is a top plan view of a support assembly including an injector installed therein.

The support assembly 10 includes a unitary frame assembly 30 which is generally triangular shape when shown in plan form in FIG. 1, and includes legs 31,31 which extend perpendicularly to the plane of the triangle at opposite corners of the base of the triangle, and a leg 32 which is positioned on the end of the frame 30 adjacent to the support member 20. The frame 30 includes a generally planar support plate portion 33, and reinforcing ribs 34,34 extend out to the corners to support legs 31. A center hub or column 35 is integral with support portion 33 and has a central opening 36. On diametrically opposite sides of this central opening there are vertical internal guideways 37. Guideways 37 are 180° apart, and are used to slidably receive and mount a flat tang 38 of a suction cup assembly. The suction cup assembly includes a large suction cup 40, which has a neck 41 in which the tang 38 is mounted. The suction cup assembly is a conventional unit, and such suction cups are generally made of a resilient material such as rubber which will seal against a nonporous surface.

The tang 38 has a central opening 39 that is used as a cam or crank follower, and an eccentric or crank assembly 42 passes through the opening 39. The crank assembly 42 has a throw or eccentric portion 43 at the center portion aligned with the edges of the opening 39, and an actuator handle 44 is provided at one end of the crank assembly 42. The crank assembly 42 is rotatably mounted on the center column 35 in provided recesses 45 as shown in FIG. 2.

The crank is retained in these recesses 45 through a clamped on, spring blade 50 that is spaced above the upper surface of the center column 35 with spacer members 51. The blade 50 is securely mounted to the frame 30 at the upper side of the central column 35 through the use of suitable fasteners 52.

The throw 43 of the crank 42 is to load the frame 30 securely down against the windshield 11 after the suction cup 40 has been placed on the windshield. Initially, the actuating arm 44 of the crank assembly 42 will be in its upright position as shown in dotted lines in FIG. 2 and this will make the throw 43 of the crank generally horizontal, thereby increasing the allowable space between the sealing edges of the suction cup 40 and the lower side of the frame 30. When the arm 44 is moved to a position as shown in FIG. 2 in solid lines, the throw will provide a relative force between the tang 38 and the frame 30 to tend to move the tang upwardly relative to the frame as shown in FIG. 2, or conversely, to move the frame downwardly toward the windshield when the suction cup 40 has been manually placed on the windshield. The legs 31 and 32 are thus forced against the windshield and the cup which seals on the windshield, stretches under the load of crank throw 43 to resiliently load the frame 30 against the windshield.

It should be noted that the legs 31 and 32 have small rubber tips 31A and 32A, respectively, which bear against the windshield and tend to keep the frame 30 from slipping once it is engaged with the windshield.

The blade 50 extends in direction toward the support member 20, and is made of a slightly springy material. As shown, a control screw 60 is threadably mounted into a boss 61 which is formed integrally with the frame 30. The screw 60 passes through an aperture in the blade 50, and the screw 60 has a bearing collar 62 that bears against the upper surface of the blade. Upon threading of the screw relative to the boss 61, the blade 50 will be forced so that its outer end will be forced toward planar member 33.

The end of the frame 30 forming the apex of its triangle shape opposite from the legs 31, has a hub 64 integral therewith. The hub 64 is bored out and slidably mounts a pin 65. The pin 65 can move up and down relative to this bore, and is rotatably mounted in the bore of hub 64 so that it can move about its axis. The pin 65 has a cross control lever 66 which is mounted through an aperture or cross bore. The cross control lever has a leg 67 which passes through the aperture in the pin 65, and the leg 67 is held in place underneath the blade 50. Thus, the blade 50 bears down on this leg 67 of the control lever and the control lever 66 can be moved as indicated by the arrow 68 to a dotted line position as shown in FIG. 1. This in turn will cause the pin 65 to rotate about its upright axis.

At the lower end of the pin 65, below the hub 64, there is a support arm 71 fixedly attached to the pin 65 with a suitable clamp or fastening means. The arm 71 is secured to the pin and moves with the pin 65 when the pin is rotated.

Figure 4:
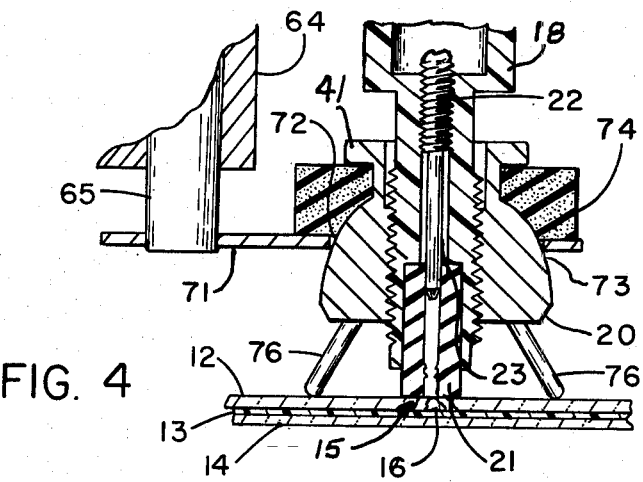
FIG. 4 is a fragmentary side view of the portion that supports an injector assembly with parts in section and parts broken away.

The arm 71 in turn has an aperture indicated at 72 (see FIG. 4) at its outer end. The support member 20 is mounted in this aperture. It can be seen that the support member 20 has a part spherical outer surface indicated at 73 which bears against the lower edges of the aperture 72. The part spherical surface permits the support member 20 to tilt universally relative to the arm 71 while under compression. The upper portion of the support member 20 extends through the opening and has a small annular flange collar formed on it. A resilient doughnut or ring of rubber 74 is placed around the upper portion of the support member 20 on the upper side of the arm 70 and under the collar. The resilient ring holds the support member 20 on the arm 71 with part spherical surface 73 bearing against the underside of arm 71 to prevent the support member 20 from falling downwardly through the aperture 72.

The support member 20 in turn has three legs 76 on its lower side, which form a tripod. These legs 76 may be made of suitable plastic or other material which does not mark the windshield being repaired. If desired, the legs 76 can be made in separate pieces from the support member 20, which is usually made of aluminum or similar material.

As the tripod legs 76 engage a windshield to be repaired, they will move or swivel the support member 20 in the aperture 72 until the legs 76 all contact the windshield in the normal self leveling section of a tripod. The axis of the bore through the support member 20 is then normal to the plane defined by the outer tips of the legs 76, which plane is generally parallel to the tangent plane at the center of the opening to the bull's-eye break 15. Therefore, even on a curved windshield, the legs 76 serve to orient the axis of the support member 20 and the injector assembly 17 normal to the tangent plane at the apex of the break when the axis of the injector is centered over the break. This serves to properly orient the tube member 21 so that the end engaging the windshield seals well around the opening to the break 15. The tripod legs 76 also provide stability for support of the injector assembly directly adjacent the injector. The legs 76 are mechanically coupled to the support member 20 and the member 20 directly supports the injector through screw threads without intervening spring members.

It can be seen that the pin or rod 65 can move up and down in the hub 64 a limited amount. The leg 67 of the control arm 66 bears against the upper edges of the hub 64 to prevent the pin 65 from falling downwardly through the hub 64. Of course the only time that it would fall downwardly is when the frame 30 was removed from the windshield 11.

In operation, then, the control arm 44 which regulates the eccentric 43 for the suction cup assembly is moved to its dotted line position. The suction cup assembly thus protrudes downwardly below the support plane of the legs 31A and 32A. An initial alignment is made relative to the break 15 by visually aligning the center of the injector assembly 17 (which is supported in member 20) over the break. The suction cup 40 is then pushed down so that its edges seal on the windshield. The cup can be made to adhere to the windshield surface. It is made fairly secure, but if desired left loose enough to permit sliding the cup for more accurate visual alignment of the injector. The end members 31A and 32A of legs 31 and 32 rest against the windshield. When the injector is located, the control arm 40 is moved in counterclockwise direction as shown in FIG. 2 to pull the tang 38 upwardly relative to the frame 30 and this tends to stretch the top of the suction cup upwardly and a resilient force pushes the feet 31A and 32A firmly against the surface of the windshield.

It can be seen that even with a curve in the windshield, the support member 20, through its legs 76, will engage the surface of the windshield, and the force with which the support member legs 76 engage the windshield is controlled by threading the screw 60 to bend the blade 50 and apply a spring load to the rod 65 through the arm portion 67 of lever 66. Final alignment of the injector can be made by swinging the control lever 66 about the axis of the rod 65 prior to tightening down the screw 60. The screw 60 as shown can have a convenient hand wheel at the top.

Further, it should be noted that the part spherical outer surface 73 of member 20 will permit the legs 76 to seek their support plane inasmuch as they are tripod legs. The legs then firmly hold the injector assembly 17 in the proper position for injecting resin into the crack to be repaired.

The present bridge has the advantage of being stable, and being self leveling in that the tripod legs of the frame provide the proper stable support and the legs 76 for supporting the injector assembly independently level themselves along the small diameter described by the ends of the legs 76. The self leveling of legs 76 eliminates the need for utilizing leveling screws, which can be time consuming in certain instances. The alignment is made easier too, by permitting the support member 20 and arm 71 to be rotated about the axis of pin 65 for correct alignment with the break.

The amount of force toward the windshield on tube 21 also can be controlled so that good sealing is achieved even with a curved windshield because of the leveling of the legs 76. The support plane of legs 76 can be on a different level than and at an angle to the plane defined by the bottom surfaces of the feet members 31A and 32A.

In removing the suction cup, small lugs 40A can be provided for lifting the edges of the suction cup to break the seal and thus let the unit be easily raised after crank 44 has been released.

Suction cup sealer (grease) can be used for greater holding power. Repair apparatus other than the injector shown can be used with a support member such as 20 which is "self leveling" independently of the self leveling main frame 30.

What I claim is:

1. A support assembly for supporting an apparatus on a surface such as a windshield comprising a first support member, means for supporting said first member on said surface, a second support member, said second support member including means to engage the surface and independently position and support said second support member on said surface in fixed position relative to the surface, means to mount said second support member to said first support member to permit the second member to rest on the same surface as the first member and including means permitting tilting of said second member relative to the first member whereby said second member can swivel to permit the means to engage the surface to seek a support plane independent of the first support means, said second member including means to mechanically engage the surface, and bias means acting between the first and second members to urge the second member against the surface.

2. The combination as specified in claim 1 wherein said means to mount said second support member to said first support member includes means to permit said second support member to move a desired amount with respect to said first support member toward and away from the surface on which the first support member is mounted against the action of the bias means.

3. The combination as specified in claim 1 wherein said means permitting tilting comprises a part spherical surface on said second support member, and means forming a receptacle to receive said part spherical surface and to bear against said part spherical surface under compressive loads from said first support member to said second support member.

4. The combination as specified in claim 3 wherein said second support includes means to mount an injector assembly for injecting material into openings in a windshield on which the second support is mounted.

5. The combination as specified in claim 4 wherein said first support member includes mounting legs arranged in a tripod.

6. A support apparatus for supporting members relative to surfaces including a first support frame assembly, means to support said first support frame assembly on a surface, a hub at a first end of said first support frame assembly, an arm pivotally mounted in said hub and also being mounted for movement in said hub along the axis of pivotal movement of said arm, and a second support member, means to mount said second support member on said arm to permit universal pivotal movement of said second support member relative to said arm, and means to exert a load urging said arm and said second support member toward the surface on which the first support member is mounted with respect to said first support member.

7. The combination as specified in claim 6 wherein said means to exert a load includes a spring member, and an adjustable means to adjust the force which said spring member exerts on said arm.

8. The combination as specified in claim 6 wherein said means to pivotally mount said arm comprises a pin rotatably and axially slidably mounted in said hub, and said means to exert a load comprising a leaf spring mounted on said first support member and having a free end, said free end having an aperture receiving said pin, and a cross member mounted in said pin transverse to the axis of said pin, portions of said leaf spring engaging said cross member, and means to urge said leaf spring in direction against said cross member and toward a surface on which the first support member is supported.

9. The combination as specified in claim 6 wherein said means to hold said first support member on said surface comprises a single suction cup, said first support member having a tripod leg arrangement, said suction cup being within a circle circumscribed around the interior of said tripod leg arrangement.

10. The combination as specified in claim 9 wherein said second support member includes three support legs arranged in a tripod configuration, said means to mount said second support member on said arm including a spherical surface which permits said support legs of said second support member to seek a support position on a surface on which the first support member is mounted independently of said first support member.

11. The combination as specified in claim 9 wherein said cross member on said pin comprises a leg of a control lever, said control lever being operable to pivot said pin about its axis relative to said hub.

12. A support assembly for supporting an apparatus on a surface such as a windshield comprising a first support member, means for supporting said first member on said surface, a second support member, said second support member including means to engage the surface and independently position and support said second support member on said surface, and means to mount said second support member to said first support member including an arm having a first end pivotally mounted to said first support member and a second end of the arm mounting said second support member, the mounting of the arm permitting the second support member to be moved toward and away from the surface a limited amount and pivoted about said axis from side to side relative to the first support member, said second member being mounted to the second end of the arm to permit tilting thereof relative to the first member whereby said second member can swivel to permit the means to engage the surface to seek a support plane independent of the first support member, and means to provide a spring load urging the second end of the arm in direction toward the surface on which the first and second support members are mounted.

13. A support device for supporting an injector tube assembly for repairing a glass surface generally perpendicular to a local area of a glass surface, said device comprising:

a first tripod member having three points of contact on the glass surface to be repaired circumscribing a first area on the surface and directly supporting the tripod member on the surface;

a second tripod member having three points of contact on the surface which circumscribe a second area on the surface spaced from the first area and of substantially smaller size than the first area;

means to mount said second tripod member to said first tripod member including means to permit movement of said second tripod member out of the plane defined by the three points of contact between the surface and the first tripod member and including means to permit tilting of the plane defined by the points of contact of the second tripod member and the surface relative to the first plane, and means to support the injector tube on the second tripod member.

14. The support device of claim 13 and means to exert a resilient force on said second tripod member tending to move said second tripod member toward said glass surface relative to the first tripod member.

15. The support device of claim 14 wherein said means to mount further comprises a part spherical outer surface provided on the upper portions of said second tripod member, a support member having a circular opening of size to permit portions of said second tripod member having said part spherical surface to pass through the opening to a side of the support member opposite from the glass surface, and flexible means engaging portions of said second tripod member extending through said opening on an opposite side of the support member from the glass surface to resiliently hold the second tripod member with portions extending through said opening and the part spherical surface engaging the edge of the opening.

16. The combination as specified in claim 15 wherein said means to resiliently hold comprises an elastomeric ring, and a flange formed on said second tripod member to overlie portions of said elastomeric ring and hold the elastomeric ring between the flange and the support member.

17. The support device of claim 13 wherein said second tripod member comprises a housing having a part spherical outer surface, and three support legs attached to said housing with the outer ends of said legs engaging the glass surface, a socket formed on the means to mount to receive said part spherical outer surface to permit said second tripod member to tilt relative to said socket, and means to support said injector assembly on said housing perpendicular to and generally centered in the plane defined by the contact points between the glass surface and the legs of said second tripod member.

18. The apparatus of claim 14 wherein said first tripod member has three legs, the ends of which engage said surface, and means to support said first tripod member relative to the surface comprising suction cup means independently supported on the tripod member at locations spaced from said legs, said suction cup means being operable to exert a force tending to pull the legs against said surface when the suction cup means are in operating position.

19. A support member for securely holding a device for placing liquid repair material into a crack in glass, such as a windshield, comprising a first support member having three legs arranged in a tripod configuration, means connected to said first tripod support member for supporting an injector apparatus thereon for injecting material into a crack in the glass, and a suction cup means mounted on said first support member independently of and at locations spaced from the tripod legs, said suction cup means being adapted to engage the glass surface and exert a force holding the ends of the tripod legs directly against the surface and thereby support the injector apparatus on the surface.

* * * * *

UNITED STATES PATENT OFFICE
CERTIFICATE OF CORRECTION

Patent No. 4,291,866            Dated September 29, 1981

Inventor(s) Paul S. Petersen

It is certified that error appears in the above-identified patent and that said Letters Patent are hereby corrected as shown below:

Column 6, line 49, (Claim 11, line 1), "Claim 9" should be --Claim 8--.

Signed and Sealed this

Fifteenth Day of December 1981

[SEAL]

Attest:

GERALD J. MOSSINGHOFF

Attesting Officer    Commissioner of Patents and Trademarks